(12) United States Patent
Nagano et al.

(10) Patent No.: US 6,328,468 B1
(45) Date of Patent: Dec. 11, 2001

(54) DEVICE FOR FIXING TEMPERATURE SENSING ELEMENT FOR AIR CONDITIONER AND METHOD OF ASSEMBLING THE SAME

(75) Inventors: Masatoshi Nagano, Otsu; Yukitaka Miyanagi; Junichi Okubo, both of Kyoto, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/355,027
(22) PCT Filed: Nov. 6, 1998
(86) PCT No.: PCT/JP98/04996
   § 371 Date: Nov. 19, 1999
   § 102(e) Date: Nov. 19, 1999
(87) PCT Pub. No.: WO99/28682
   PCT Pub. Date: Jun. 10, 1999

(30) Foreign Application Priority Data

Nov. 28, 1997 (JP) .................................................. 9-327787

(51) Int. Cl.$^7$ ............................. G01K 1/08; G01K 1/14
(52) U.S. Cl. ..................... 374/141; 374/145; 374/148; 374/208; 165/11.1
(58) Field of Search ................... D23/351; 165/201, 165/202, 58, 48.1, 11.1; 374/141, 145, 148, 208

(56) References Cited

U.S. PATENT DOCUMENTS

| | | | | |
|---|---|---|---|---|
| 2,055,499 | * | 9/1936 | King ........................................ | 209/45 |
| 2,081,479 | * | 5/1937 | Fink ........................................ | 62/82 |
| 3,226,943 | * | 1/1966 | Mitchell .................................. | 62/227 |
| 4,463,800 | * | 8/1984 | Hadden ................................. | 165/11 R |
| 5,381,950 | * | 1/1995 | Aldridge ................................ | 236/1 R |
| 5,638,894 | * | 6/1997 | Potier et al. ........................... | 165/121 |
| 6,092,925 | * | 7/2000 | Nojiri ...................................... | 374/16 |

FOREIGN PATENT DOCUMENTS

| | | | |
|---|---|---|---|
| 4232801 | * | 3/1994 | (DE) ................................... 374/141 |
| 0006084 | * | 1/1978 | (JP) . |
| 58-89720 | | 6/1983 | (JP) . |
| 0063439 | * | 4/1984 | (JP) . |
| 62-22453 | | 10/1987 | (JP) . |
| 63-40749 | | 3/1988 | (JP) . |
| 0064398 | * | 3/1990 | (JP) . |
| 7-146041 | | 6/1995 | (JP) . |
| 9-303911 | | 11/1997 | (JP) . |
| 11-014208 | | 1/1999 | (JP) . |

* cited by examiner

Primary Examiner—Diego Gutierrez
Assistant Examiner—Gail Verbitsky
(74) Attorney, Agent, or Firm—McDermott, Will & Emery

(57) ABSTRACT

A fixing method of a temperature sensing element of an air conditioner and its assembling method, including a fixing portion to be fixed to a main body, an opening portion forming an opening surface, a folded portion having a holding portion for holding a temperature sensing element, an accommodating portion installed as being opened at the opening surface, for accommodating a tip of the temperature sensing element, and a foldable thin wall portion installed between the opening portion and the folded portion, in which the fixing portion, opening portion, thin wall portion, and foldable portion are integrally formed, the temperature sensing element is installed in the holding portion, the thin wall portion is folded, and the folded portion is fitted to the opening portion. In this constitution, damage or breakage of the temperature sensing element can be prevented. Further, direct contact by the user is prevented. Moreover, fixing work of the temperature sensing element in the air condition is extremely facilitated. Still more, the temperature sensing element is installed correctly at specified position in the accommodating portion.

20 Claims, 6 Drawing Sheets

Fig. 5

| |
|---|
| A step of supplying a fixing device including a fixing portion for fixing in an air conditioner, an opening portion forming an opening surface, a folded portion having a holding portion for holding a temperature sensing element, an accommodating portion installed as being opened at the opening surface, for accommodating a tip of the temperature sensing element, and a foldable thin wall portion, installed between the opening portion and the folded portion. |

↓

| |
|---|
| A step of installing the temperature sensing element in the holding portion. |

↓

| |
|---|
| A step of folding the thin wall portion, fitting the holding portion to the opening portion, and fitting the folded portion to the opening portion. |

DEVICE FOR FIXING TEMPERATURE SENSING ELEMENT FOR AIR CONDITIONER AND METHOD OF ASSEMBLING THE SAME

TECHNICAL FIELD

The present invention relates to an air conditioner for sensing the temperature of air flowing into a heat exchanger and controlling various operations, and more particularly to a fixing device for fixing a temperature sensing element in the air conditioner.

BACKGROUND ART

A schematic diagram of a conventional fixing device of temperature sensing device is shown in FIG. 6. In FIG. 6, a conventional fixing device 103 comprises a temperature sensing element holder 101 for holding the tip of a temperature sensing element 100, a main body fixing portion 102 for fixing to the main body, and a recess 105 for fitting to the piping of a fin and tube heat exchanger. This fixing device was formed by using a resin material. The piping was fabricated from a copper material. In such conventional constitution, the tip of the temperature sensing element is a part of an electronic control circuit, and the temperature sensing element was installed in the air conditioner while the tip of the temperature sensing element was exposed.

The surface of the temperature sensing element of the modern air conditioner is covered with insulating resin or the like, but the thickness of this insulating film is a minimum thickness necessary for sensing air temperature, and is, for example, about 0.1 mm to about 0.2 mm. Accordingly, in the exposed state of the surface of the temperature sensing element, when the temperature sensing element is installed in the air conditioner, the surface of the coating of the tip of the temperature sensing element is likely to be flawed, and if the user touches the flawed temperature sensing element, the temperature sensing element may be broken, and the temperature control of the air conditioner becomes imperfect, which causes problems for the safety of the user.

It is hence an object of the invention to present a fixing device to prevent damage of the temperature sensing element from outside and to prevent the user from touching directly the temperature sensing element.

SUMMARY OF THE INVENTION

A fixing device of temperature sensing element of air conditioner of the invention comprises (a) a fixing portion to be fixed to a main body, (b) an opening portion forming an opening surface, (c) a folded portion having a holding portion for holding a temperature sensing element, (d) an accommodating portion disposed as being opened at the opening surface, for accommodating a tip of the temperature sensing element, and (e) a foldable thin wall portion disposed between the opening portion and the folded portion, in which the fixing portion, the opening portion, the thin wall portion, and the folded portion are integrally formed, the holding portion of the folded portion is positioned at the opening surface by folding the thin wall portion, the temperature sensing element is held in the holding portion, and the tip of the temperature sensing element is disposed in the accommodating portion.

An assembling method of fixing device of temperature sensing element of air conditioner of the invention comprises (a) a step of supplying a fixing device including a fixing portion to be fixed to a main body, an opening portion forming an opening surface, a folded portion having a holding portion for holding a temperature sensing element, an accommodating portion disposed as being opened at the opening surface, for accommodating a tip of the temperature sensing element, and a foldable thin wall portion disposed between the opening portion and the folded portion, (b) a step of disposing the temperature sensing element in the holding portion, and (c) a step of folding the thin wall portion, fitting the holding portion mounting the temperature sensing element to the opening portion, and disposing the temperature sensing element in the accommodating portion.

In this constitution, injury or breakage of the temperature sensor is prevented. Also, direct touch by the user is prevented. Moreover, it is extremely easy when fixing the temperature sensor in the air conditioner.

BRIEF DESCRIPTION OF THE DRAWINGS

FIG. 5 is a process diagram explaining an assembling method of a fixing device of a temperature sensing element of an air conditioner in an embodiment of the invention.

BEST MODE OF CARRYING OUT THE INVENTION

Figure 1:
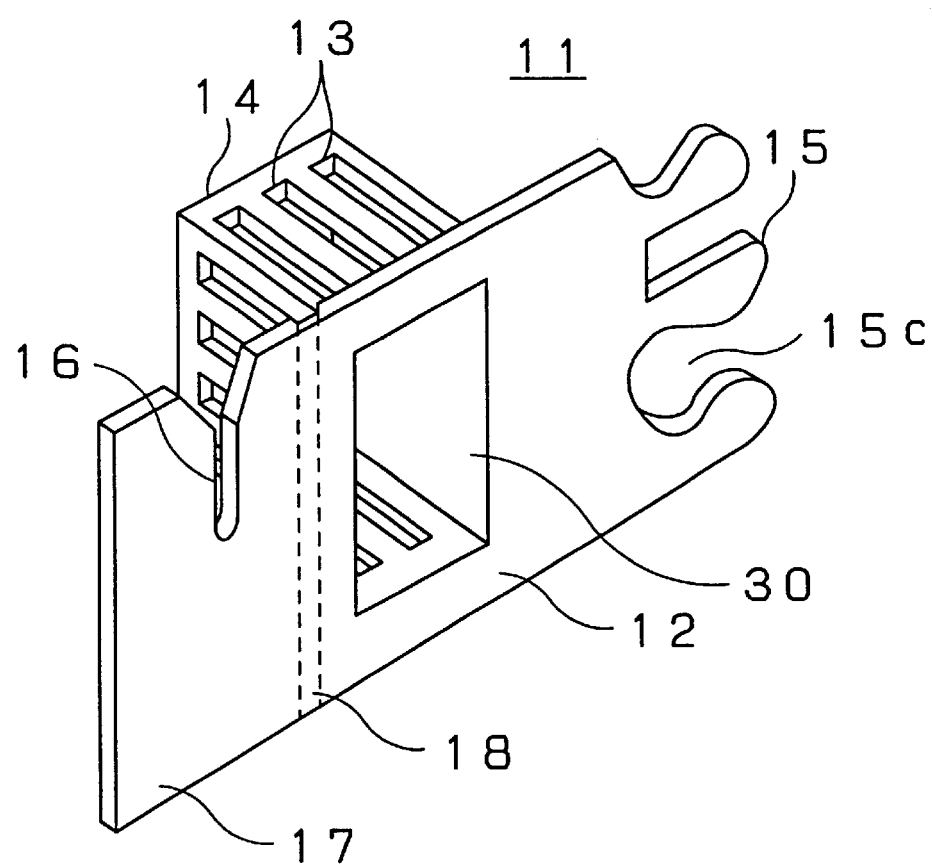
FIG. 1 is a perspective view of a fixing device of a temperature sensing element of an air conditioner showing an embodiment of the invention.

A fixing device of temperature sensing element of air conditioner of the invention comprises a fixing portion to be fixed to a main body, an opening portion forming an opening surface, a folded portion having a holding portion for holding a temperature sensing element, an accommodating portion installed as being opened at the opening surface, for accommodating a tip of the temperature sensing element, and a foldable thin wall portion installed between the opening portion and the folded portion, in which the fixing portion, the opening portion, the thin wall portion, and the folded portion are integrally formed, the holding portion of the folded portion is positioned at the opening surface by folding the thin wall portion, the temperature sensing element is held in the holding portion, and the tip of the temperature sensing element is installed in the accommodating portion.

An assembling method of fixing device of temperature sensing element of air conditioner of the invention comprises (a) a step of supplying a fixing device including a fixing portion to be fixed to a main body, an opening portion forming an opening surface, a folded portion having a holding portion for holding a temperature sensing element, an accommodating portion installed as being opened at the opening surface, for accommodating a tip of the temperature sensing element, and a foldable thin wall portion installed between the opening portion and the folded portion, (b) a step of installing the temperature sensing element in the holding portion, and (c) a step of folding the thin wall portion, fitting the holding portion mounting the temperature sensing element to the opening portion, and installing the temperature sensing element in the accommodating portion.

Preferably, after the temperature sensing element is installed in the holding portion, the thin wall portion is folded, the folded portion is fitted to the opening portion, and the temperature sensing element is installed in the accommodating portion through the opening surface.

Preferably, the accommodating portion is surrounded by a partition wall.

Preferably, the accommodating portion is a box having a plurality of through-holes.

Preferably, the folded portion being folded is fixed in the opening portion through fitting means.

Preferably, the folded portion has a first fitting part, the opening portion has a second fitting part, and the first fitting part and the second fitting part are mutually fitted so that the folded portion being folded is fixed in the opening portion.

Preferably, the fixing portion has a first fixing part installed in the opening portion, and a second fixing part installed in the folded portion, and when the thin wall portion is folded, and the folded portion is fitted to the opening portion, the first fixing part and the second fixing part compose the fixing portion.

Preferably, the accommodating portion is formed integrally with the fixing portion, the opening portion, the thin wall portion, and the folded portion.

Preferably, the accommodating portion, the fixing portion, the opening portion, the thin wall portion, and the folded portion are mutually formed integrally of a resin material.

In this constitution, injury or breakage of the temperature sensor is prevented. Also, direct touch by the user is prevented. Moreover, it is extremely easy when fixing the temperature sensor in the air conditioner. Moreover, by the use of resin material and integral forming of the fixing device, manufacture of fixing device is extremely easy, and the manufacturing cost can be reduced.

Representative embodiments of the invention are described below while referring to the accompanying drawings.

Embodiment 1

A perspective view of a temperature sensing element fixing device in an embodiment of the invention is shown in FIG. 1. In FIG. 1, a temperature sensing element fixing device 11 comprises a fixing portion 15 to be fixed to a main body, an opening portion 12 forming an opening surface 30, a folded portion 17 having a holding portion 16 for holding a temperature sensing element, a foldable thin wall portion 18, and an accommodating portion 14 for accommodating a tip of the temperature sensing element. The accommodating portion 14 is a box having a box shape. The accommodating portion 14 is installed as being opened at the opening surface 30. The accommodating portion 14 has a plurality of through-holes 13, and the plurality of through-holes 13 allow the air to move in and out of the accommodating portion. The thin wall portion 18 is installed between the opening portion 12 and the folded portion 17. The fixing portion 15, opening portion 12, thin wall portion 18, and folded portion 17 are integrally formed. The fixing portion 15 has a recess 15c for fixing to a heat exchanger or the like. The accommodating portion 14, fixing portion 15, opening portion 12, thin wall portion 18 and folded portion 17 may be also formed integrally by using a resin material.

Figure 2:
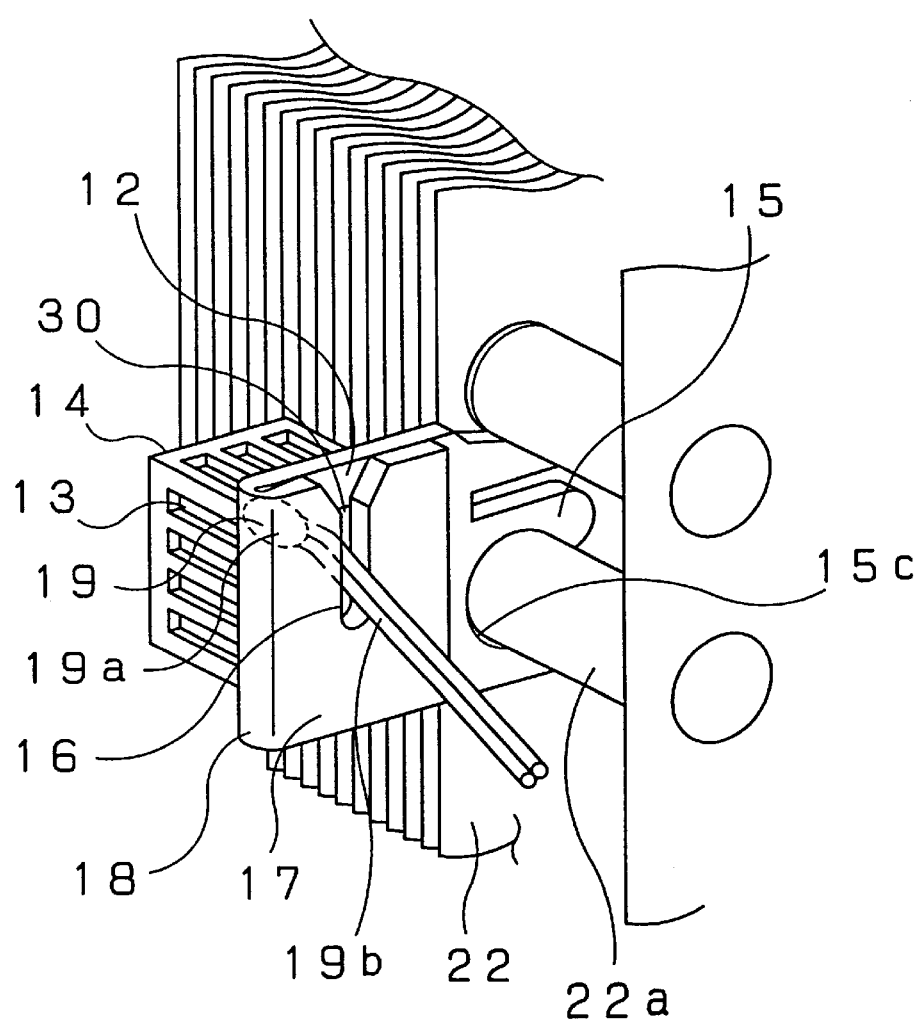
FIG. 2 is a perspective view of state of installation of the temperature sensing element in the air conditioner by using the fixing device shown in FIG. 1.

The state of the fixing device 11 of the embodiment installed in the air conditioner is shown in FIG. 2. In FIG. 2, the temperature sensing element 19 is installed in the temperature sensing element holding portion 16, and then the thin wall portion 18 is folded, and the folded portion 17 is fitted to the opening portion 12. At this time, the tip of the temperature sensing element 19 is installed in the accommodating portion 14 through the opening surface 30. The recess 15c of the fixing portion 15 is fitted to a piping 22a of a heat exchanger 22, and the fixing device 11 holding the temperature sensing element 19 is fixed on the air conditioner.

In this embodiment, of the plurality of through-holes 13 formed in the accommodating portion 14, each through-hole has a rectangular shape having a side not longer than 3 mm. The tip of the temperature sensing element 19 is designed so as not to penetrate through this through-hole. It is also designed that a finger of the user may not penetrate through the through-hole. Each through-hole is not limited to a rectangular shape, but may be formed in an arbitrary shape including circular, square or polygonal shape. When the shape of each through-hole is designed not to allow passing of finger of the user through the through-hole, the safety of the device is enhanced. Moreover, when the shape of the holding portion 16 is designed so as not to allow passing of the temperature sensing part at the tip of the temperature sensing element 19, dropping of the temperature sensing element 19 can be prevented. The shape of the holding portion 16 is desired to be capable of holding the temperature sensing element 19. As the shape for satisfying the both conditions, the through-holes of a nearly V-section as shown in FIG. 1 are preferred.

A process diagram explaining an assembling method of a fixing device of a temperature sensing element of an air conditioner in an embodiment of the invention is shown in FIG. 5. The assembling method of the fixing device of the temperature sensing element comprises the following steps.

(a) A step of supplying a fixing device 11 including a fixing portion 15 for fixing in an air conditioner, an opening portion 12 forming an opening surface 30, a folded portion 17 having a holding portion 16 for holding a temperature sensing element 19, an accommodating portion 14 installed as being opened at the opening surface 30, for accommodating a tip of the temperature sensing element 19, and a foldable thin wall portion 18 installed between the opening portion 12 and the folded portion 17.

(b) A step of installing the temperature sensing element 19 in the holding portion 16.

(c) A step of folding the thin wall portion 18, fitting the holding portion 16 to the opening portion 12, and fitting the folded portion 17 to the opening portion 12.

In this process, for example, the following two methods are possible. That is, after installing the temperature sensing element 19 in the holding portion 16, the folded portion 17 holding this temperature sensing element 19 is fitted into the opening portion 12. Or, by folding the thin wall portion 18, the holding portion 16 is fitted to the opening portion 12, the folded portion 17 is fitted to the opening portion 12, then the temperature sensing element 19 is installed in the holding portion 16. In the former method, "after installing the temperature sensing element 19 in the holding portion 16, the folded portion 17 holding this temperature sensing element 19 is fitted into the opening portion 12," it is effective when installing a large temperature sensing element in the accommodating portion. In this case, the size of the holding portion 16 does not depend on the size of the temperature sensing element 19, and it may be formed in an arbitrary shape. In the latter method, "by folding the thin wall portion 18, the holding portion 16 is fitted to the opening portion 12, the folded portion 17 is fitted to the opening portion 12, then the temperature sensing element 19 is installed in the holding portion 16," the holding portion 16 is preferred to shaped to have a first holding hole in a proper size allowing to pass the temperature sensing part at the tip of the temperature sensing element 19, and also a second holding hole capable of holding the temperature sensing element 19 simultaneously. As the shape to satisfy the both conditions, as shown in FIG. 2, a nearly V-section is preferred. That is, through the first holding hole of the wider part in the upper portion of the V-section hole, the tip 19a of the temperature sensing element 19 is inserted into the accommodating portion 14, and then the thin part 19b of the temperature sensing element 19 is held by the second holding hole in the narrower part in the lower portion of the V-section. Incidentally, the method "after installing the temperature sensing element 19 in the holding portion 16, the folded portion 17 holding this temperature sensing element 19 is fitted into the opening portion 12" more preferable than the method "after fitting the folded portion 17 holding the temperature sensing element 19 into the opening portion 12, the temperature sensing element 19 is installed in the holding portion 16." In this case, the shape of the holding portion may be designed in an arbitrary shape.

Embodiment 2

Figure 3:
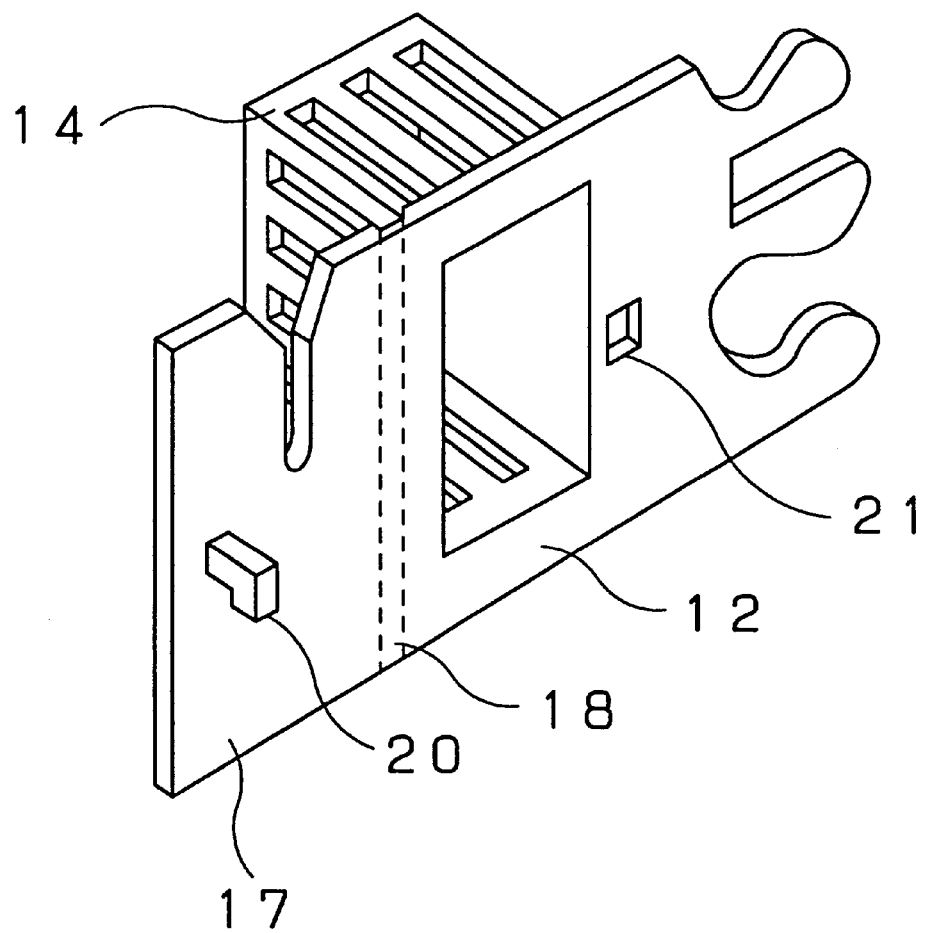
FIG. 3 is a perspective view of a fixing device of a temperature sensing element of an air conditioner showing other embodiment of the invention.

Other embodiment of the fixing device of the invention is shown in FIG. 3. In FIG. 3, a fixing pawl having a key-like tip as a first fitting part 20 is installed in a folded portion 17. A hole 21 is set in an opening portion 12 as a second fitting part 21. The other constitution is same as the fixing device shown in FIG. 1. When a thin wall portion 18 is folded by 180 degrees as a deflected portion, and the folded portion 17 is fitted to the opening portion 12, the first fitting part 20 is engaged with the second fitting part 21, and the folded portion 17 is coupled to the opening portion 12. At the same time, a tip 19a of a temperature sensing element 19 passes through an opening surface 30, and is installed in an accommodating portion 14. The first fitting part 20, second fitting part 21, folded portion 17, thin wall portion 18, opening portion 12, accommodating portion 14, and fixing portion 15 are mutually formed integrally by using a resin material. In this constitution, by the reaction of folding of the thin wall portion 18, the first fitting part 20 is completely fitted to the second fitting part 21, and the tip 19a of the temperature sensing element 19 can be securely installed in the accommodating portion 14.

Embodiment 3

Figure 4:
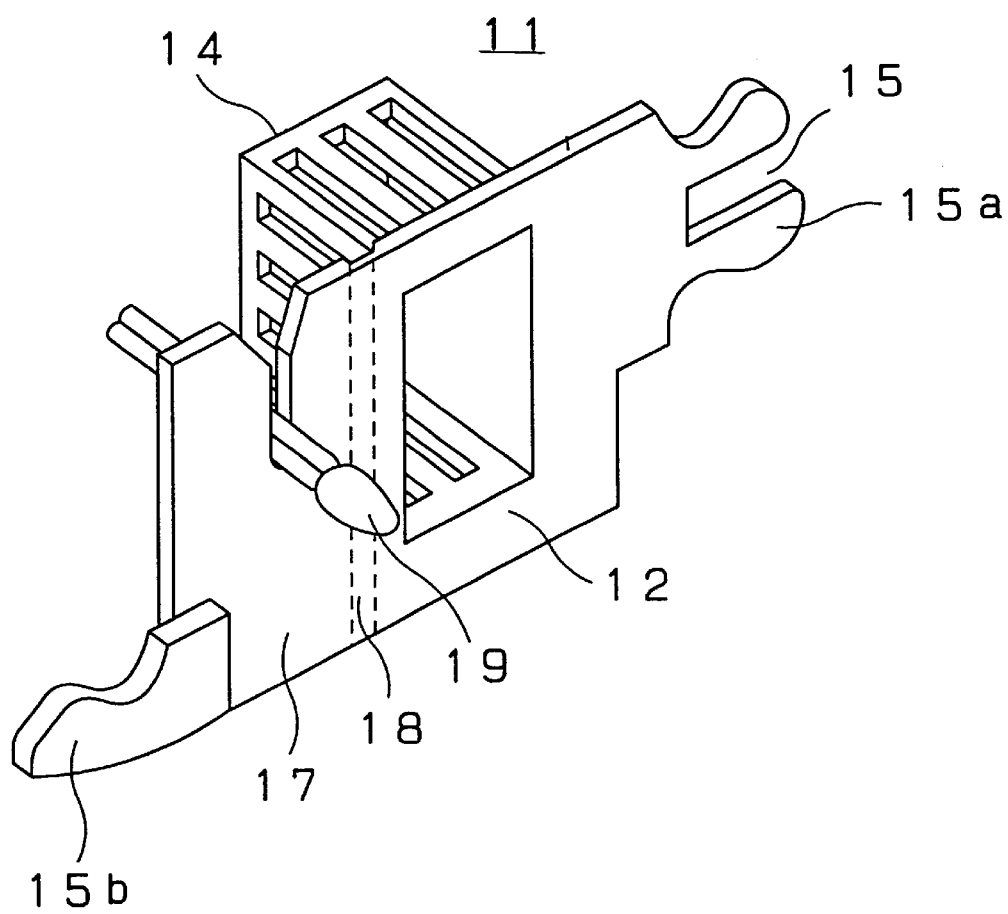
FIG. 4 is a perspective view of a fixing device of a temperature sensing element of an air conditioner showing a different embodiment of the invention.
Figure 6:
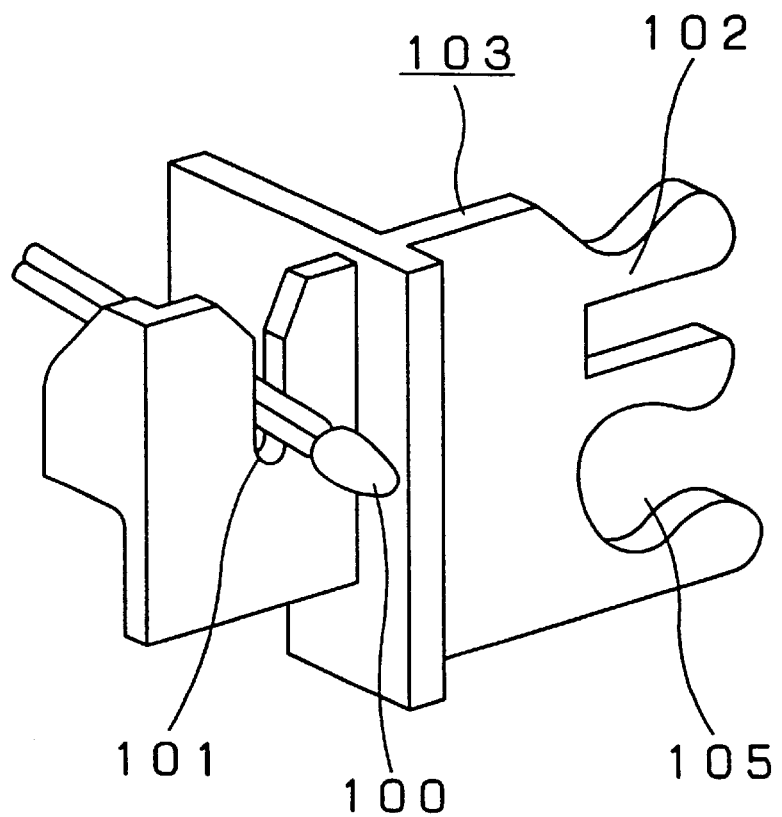
FIG. 6 is a perspective view of a fixing device of a temperature sensing element of an air conditioner in a prior art.

A different embodiment of the fixing device of the invention is shown in FIG. 4. In FIG. 4, a first fixing piece as a first fixing part 15b is installed in a folded portion 17, and a second fixing piece as a second fixing part 15a is installed in a fixing portion 15. The other constitution is same as the fixing device shown in FIG. 1. When a thin wall portion 18 is folded by 180 degrees as a deflected portion, and the folded portion 17 is fitted to an opening portion 12, the first fixing part 15b and the second fixing part 15a form a recess 15c. Thus, the fixing portion 15 is formed, and a tip of a temperature sensing element 19 is installed in an accommodating portion 14. Moreover, the formed recess 15c is fitting to a piping 22a of a heat exchanger 22, and a fixing device 11 is fixed in an air conditioner. In this embodiment, the accommodating portion 14, first fixing pat 15b, second fixing part 15a, opening portion 12, thin wall portion 18, and folded portion 17 may be mutually formed integrally by using a resin material.

Industrial Applicability

In the constitution of the invention, damage or breakage of the temperature sensing element can be prevented. Further, direct contact by the user is prevented. Fixing work of the temperature sensing element in the air condition is extremely facilitated. The temperature sensing element is installed correctly at specified position in the accommodating portion.

REFERENCE NUMERALS

11 Fixing device of temperature sensing element
12 Opening portion
13 Plurality of through-holes
14 Accommodating portion
15 Fixing portion to main body
15a Second fixing part
15b First fixing part
15c Recess
16 Holding portion for holding temperature sensing element
17 Folded portion
18 Thin wall portion
19 Temperature sensing element
19a Tip of temperature sensing element
19b Thin part of temperature sensing element
20 First fitting part
21 Second fitting part
22 Heat exchanger
22a Piping
30 Opening surface

What is claimed is:

1. A fixing device of temperature sensing element of air conditioner comprising:
    (a) a fixing portion for fixing to a main body,
    (b) an opening portion forming an opening surface,
    (c) a folded portion having a holding portion for holding a temperature sensing element,
    (d) an accommodating portion disposed as being opened at said opening surface, for accommodating a tip of said temperature sensing element, and
    (e) a foldable thin wall portion disposed between said opening portion and said folded portion,
    wherein said fixing portion, said opening portion, said thin wall portion, and said folded portion are integrally formed,
    said holding portion of said folded portion is positioned at said opening surface by folding said thin wall portion,
    said temperature sensing element is held in said holding portion, and
    said tip of said temperature sensing element is positioned in said accommodating portion.

2. A fixing device of temperature sensing element of air conditioner of claim 1, wherein after said temperature sensing element is installed in said holding portion, said thin wall portion is folded, said folded portion is fitted to said opening portion, and said temperature sensing element is disposed in said accommodating portion through said opening surface.

3. A fixing device of temperature sensing element of air conditioner of claim 1, wherein said accommodating portion is surrounded by a partition wall.

4. A fixing device of temperature sensing element of air conditioner of claim 1, wherein said accommodating portion is a box having a plurality of through-holes.

5. A fixing device of temperature sensing element of air conditioner of claim 1, wherein said folded portion being folded is fixed in said opening portion through fitting means.

6. A fixing device of temperature sensing element of air conditioner of claim 1, wherein said folded portion has a first fitting part, said opening portion has a second fitting part, and said first fitting part and said second fitting part are mutually fitted so that said folded portion being folded is fixed in said opening portion.

7. A fixing device of temperature sensing element of air conditioner of claim 1, wherein said fixing portion has a first fixing part disposed in said opening portion, and a second fixing part disposed in said folded portion, and when said thin wall portion is folded, and said folded portion is fitted to said opening portion, said first fixing part and said second fixing part compose said fixing portion.

8. A fixing device of temperature sensing element of air conditioner of claim 1, wherein said accommodating portion is formed integrally with said fixing portion, said opening portion, said thin wall portion, and said folded portion.

9. A fixing device of temperature sensing element of air conditioner of claim 1, wherein said accommodating portion, said fixing portion, said opening portion, said thin wall portion, and said folded portion are mutually formed integrally of a resin material.

10. A fixing device of temperature sensing element of air conditioner of claim 1, wherein said holding portion has a first holding hole allowing said tip of said temperature sensing element to pass, and a second holding hole capable of holding said temperature sensing element.

11. An assembling method of fixing device of temperature sensing element of air conditioner comprising the steps of:

(a) supplying a fixing device including a fixing portion to be fixed to a main body, an opening portion forming an opening surface, a folded portion having a holding portion for holding a temperature sensing element, an accommodating portion installed as being opened at said opening surface, for accommodating a tip of said temperature sensing element, and a foldable thin wall portion disposed between said opening portion and said folded portion, (b) disposing said temperature sensing element in said holding portion, and (c) folding said thin wall portion, fitting said holding portion to said opening surface, and fitting said folded portion to said opening portion.

12. An assembling method of fixing device of temperature sensing element of air conditioner of claim 11, wherein after said temperature sensing element is disposed in said holding portion, said thin wall portion is folded, said folded portion is fitted to said opening portion, and said temperature sensing element is disposed in said accommodating portion through said opening surface.

13. An assembling method of fixing device of temperature sensing element of air conditioner of claim 11, wherein said accommodating portion is surrounded by a partition wall.

14. An assembling method of fixing device of temperature sensing element of air conditioner of claim 11, wherein said accommodating portion is a box having a plurality of through-holes.

15. An assembling method of fixing device of temperature sensing element of air conditioner of claim 11, wherein said folded portion being folded is fixed in said opening portion through fitting means.

16. An assembling method of fixing device of temperature sensing element of air conditioner of claim 11, wherein said folded portion has a first fitting part, said opening portion has a second fitting part, and said first fitting part and said second fitting part are mutually fitted so that said folded portion being folded is fixed in said opening portion.

17. An assembling method of fixing device of temperature sensing element of air conditioner of claim 11, wherein said fixing portion has a first fixing part disposed in said opening portion, and a second fixing part disposed in said folded portion, and when said thin wall portion is folded, and said folded portion is fitted to said opening portion, said first fixing part and said second fixing part compose said fixing portion.

18. An assembling method of fixing device of temperature sensing element of air conditioner of claim 11, wherein said accommodating portion is formed integrally with said fixing portion, said opening portion, said thin wall portion, and said folded portion.

19. An assembling method of fixing device of temperature sensing element of air conditioner of claim 11, wherein said accommodating portion, said fixing portion, said opening portion, said thin wall portion, and said folded portion are mutually formed integrally of a resin material.

20. An assembling method of fixing device of temperature sensing element of air conditioner of claim 11, wherein said holding portion has a first holding hole allowing said tip of said temperature sensing element to pass, and a second holding hole capable of holding said temperature sensing element, and after said thin wall portion is folded and said folded portion is fitted to said opening portion, said temperature sensing element is disposed in said holding portion.

* * * * *